Patented Sept. 29, 1936

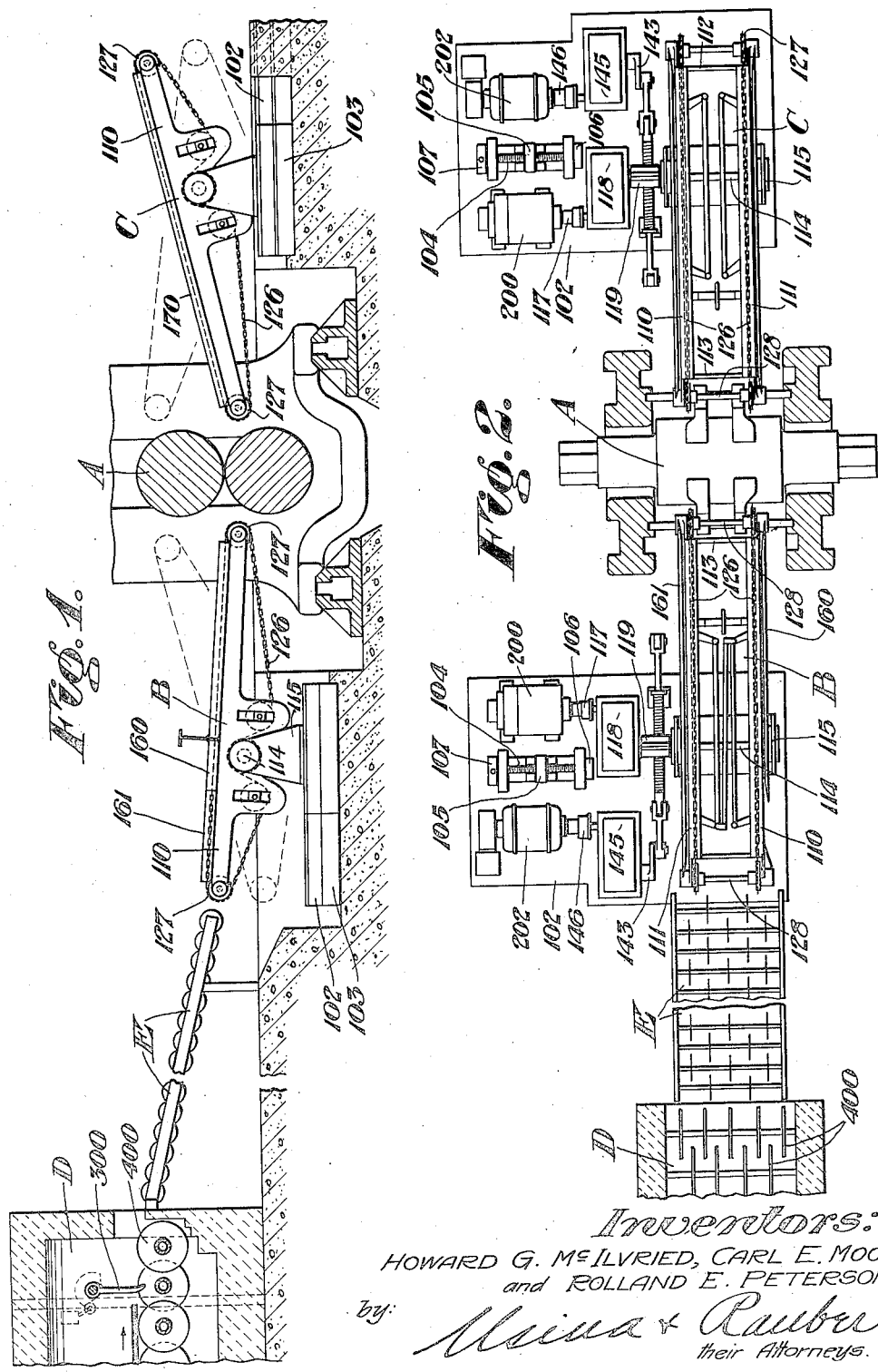

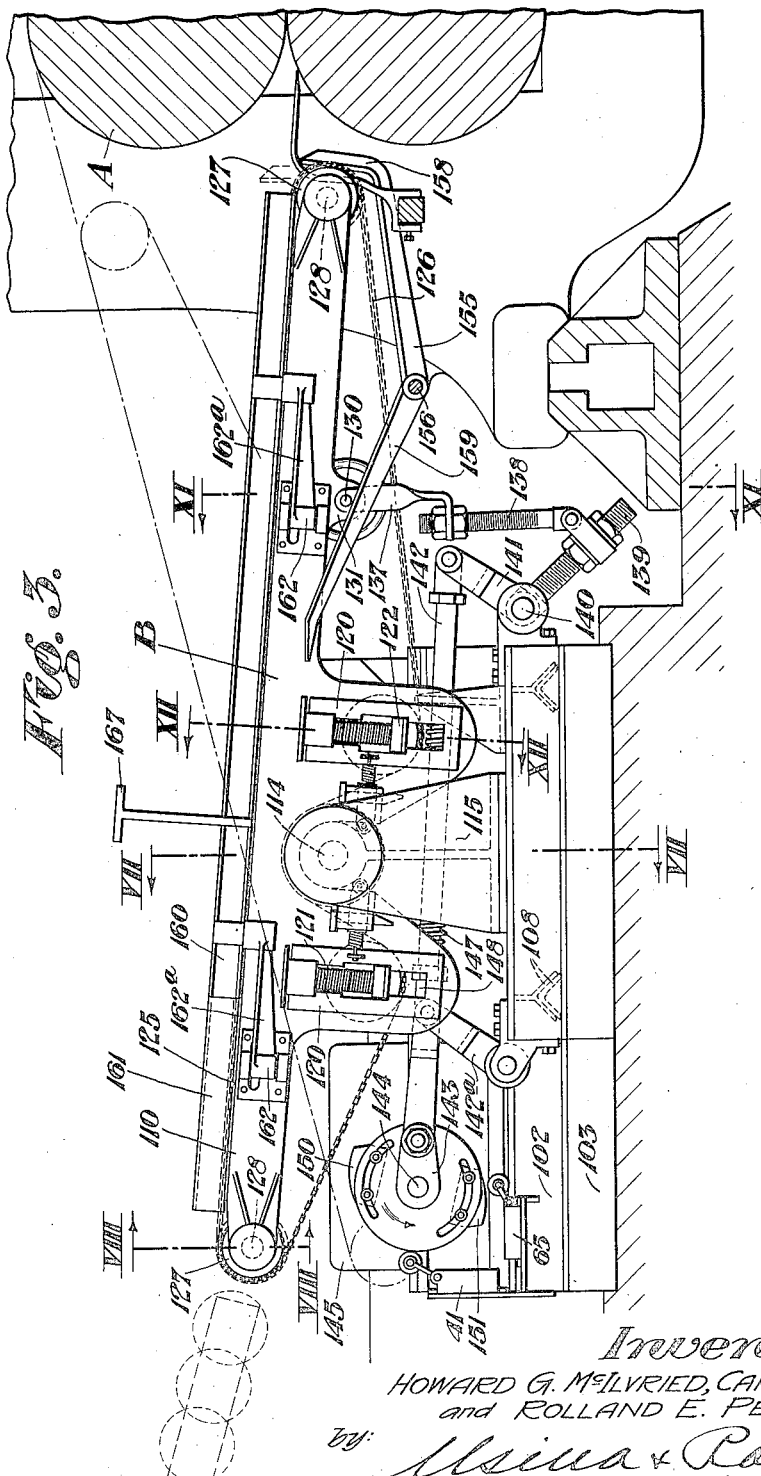

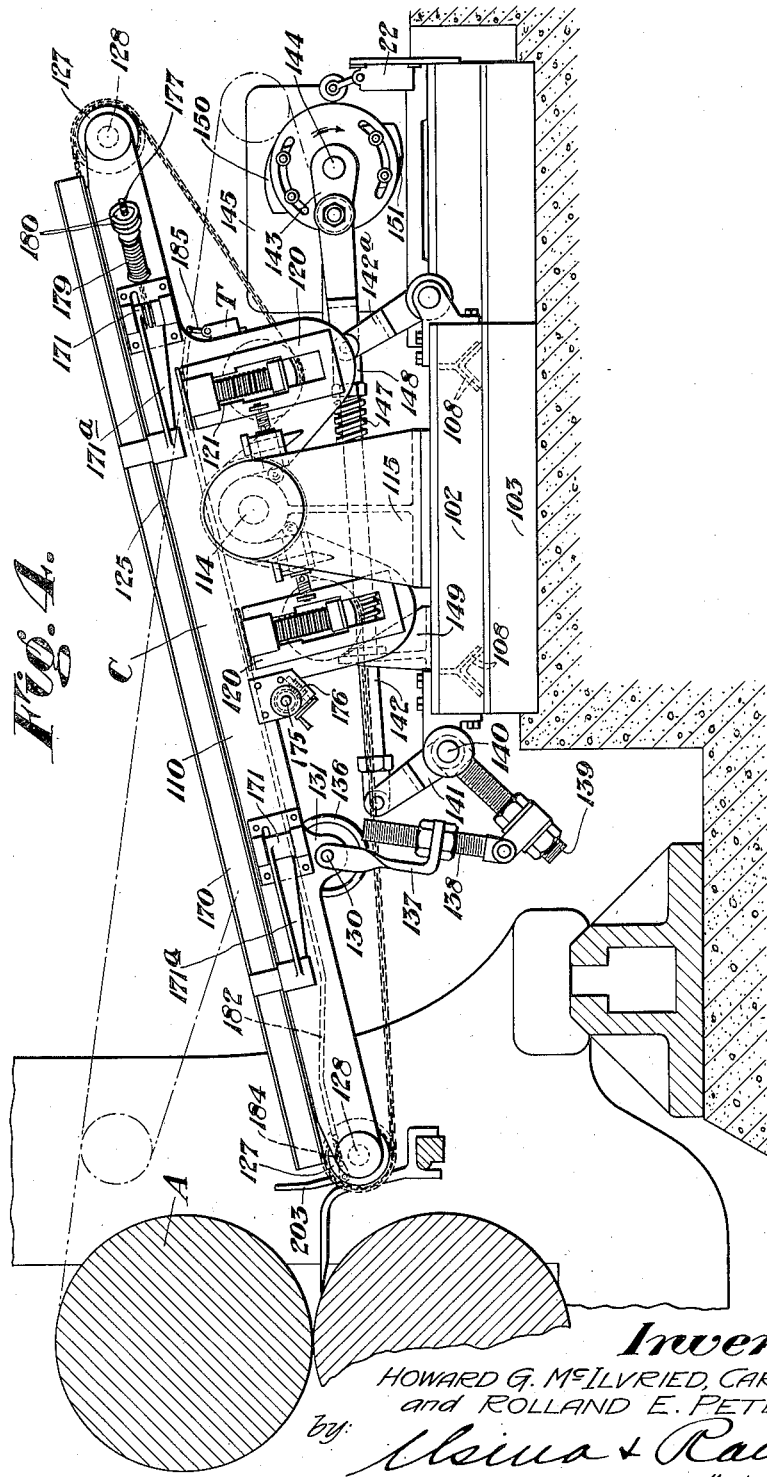

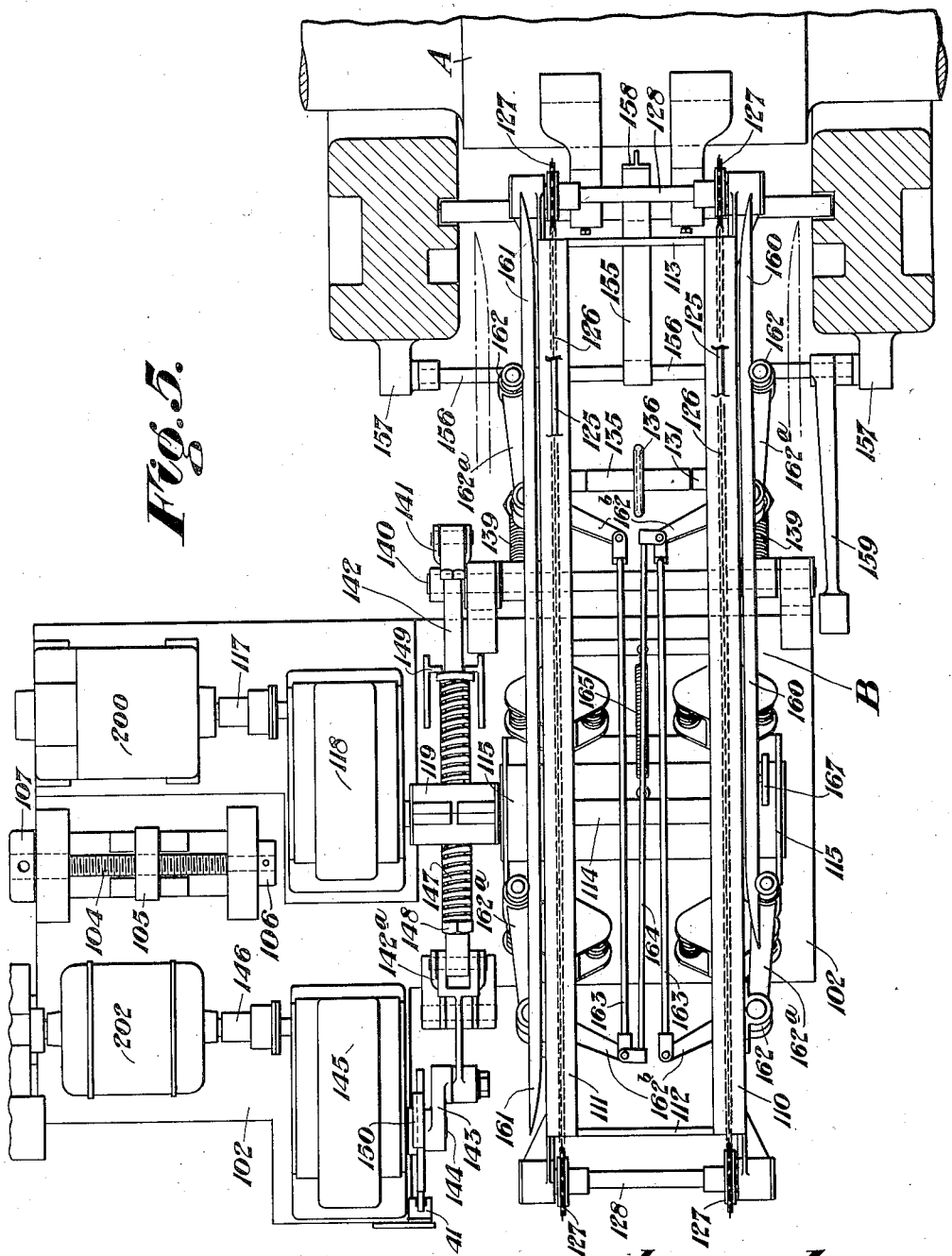

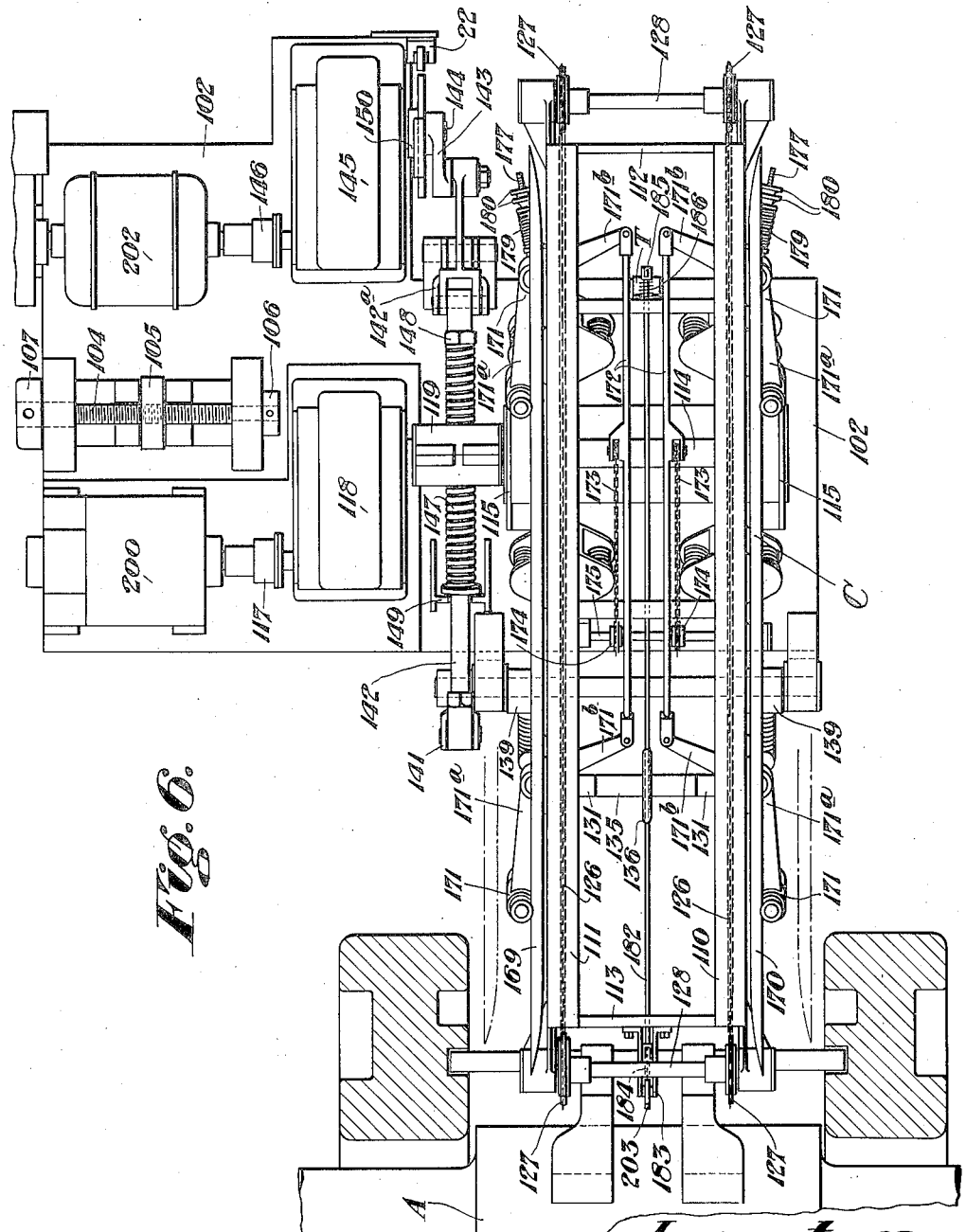

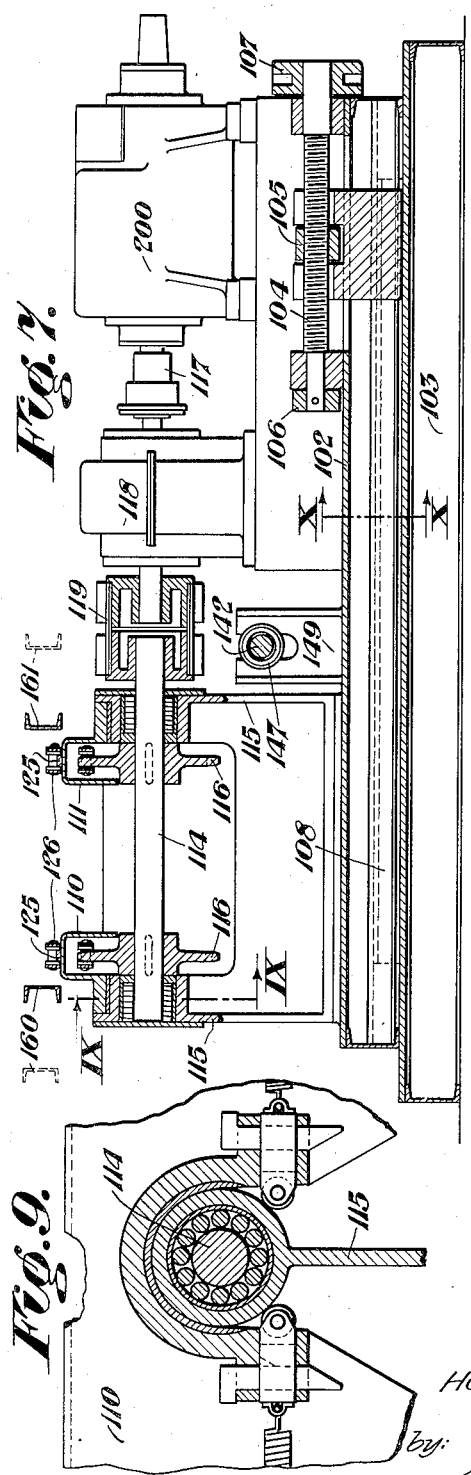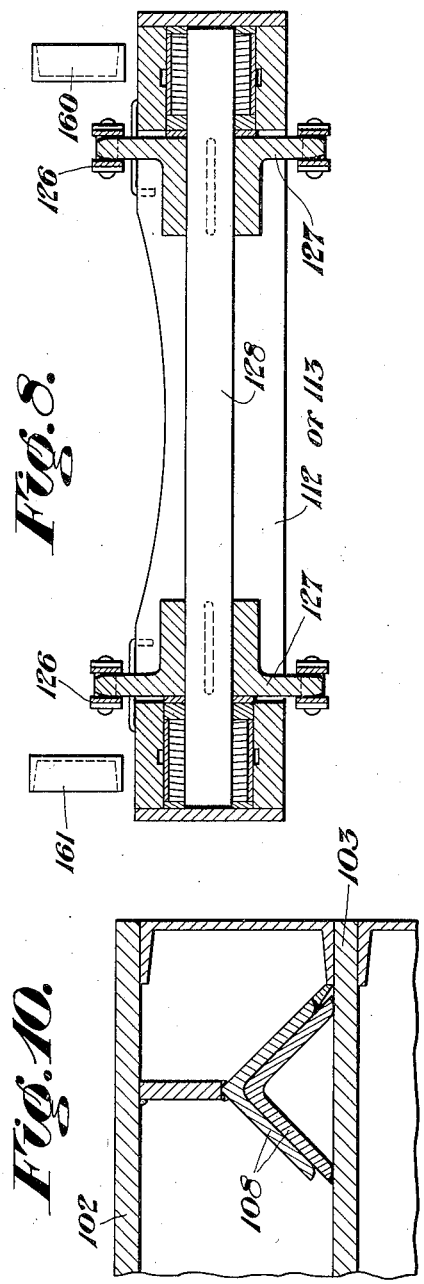

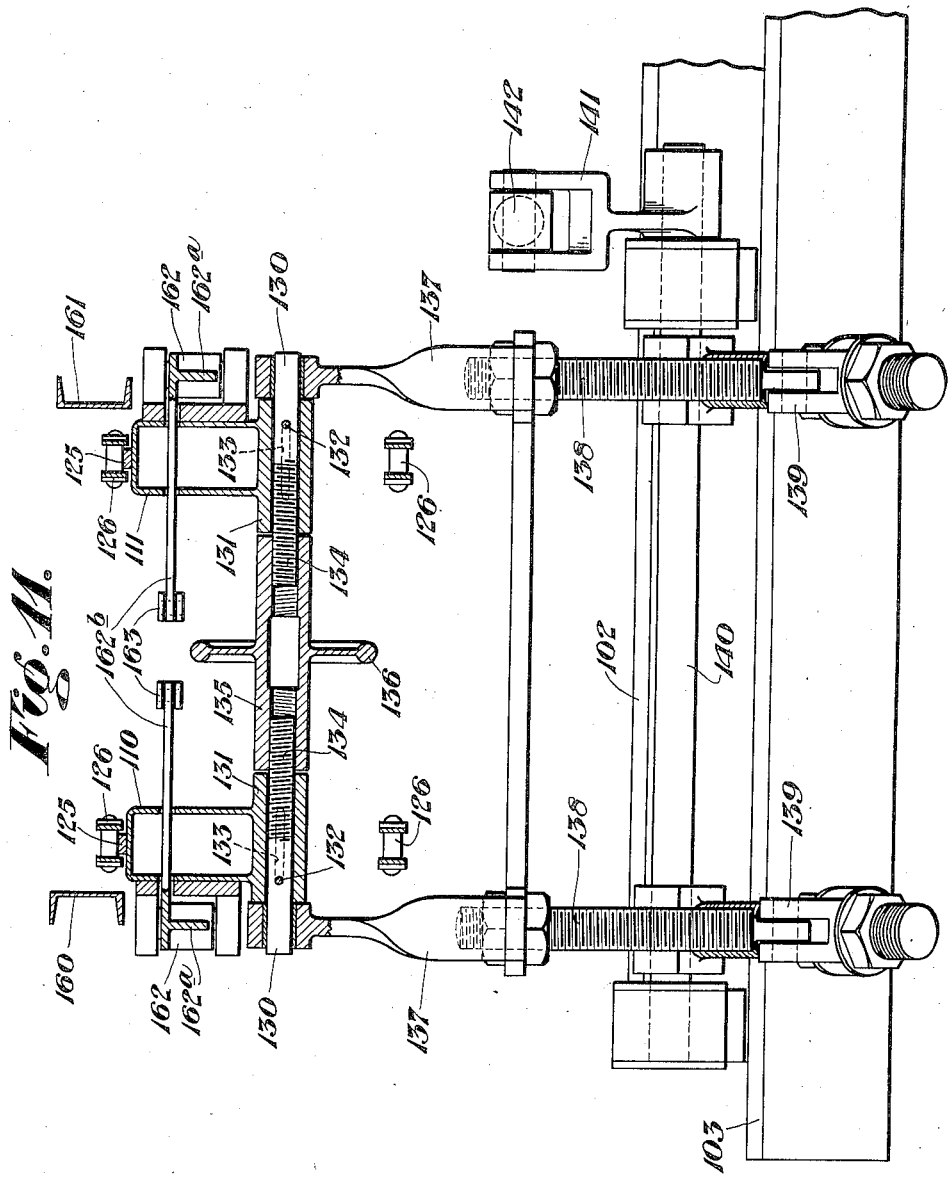

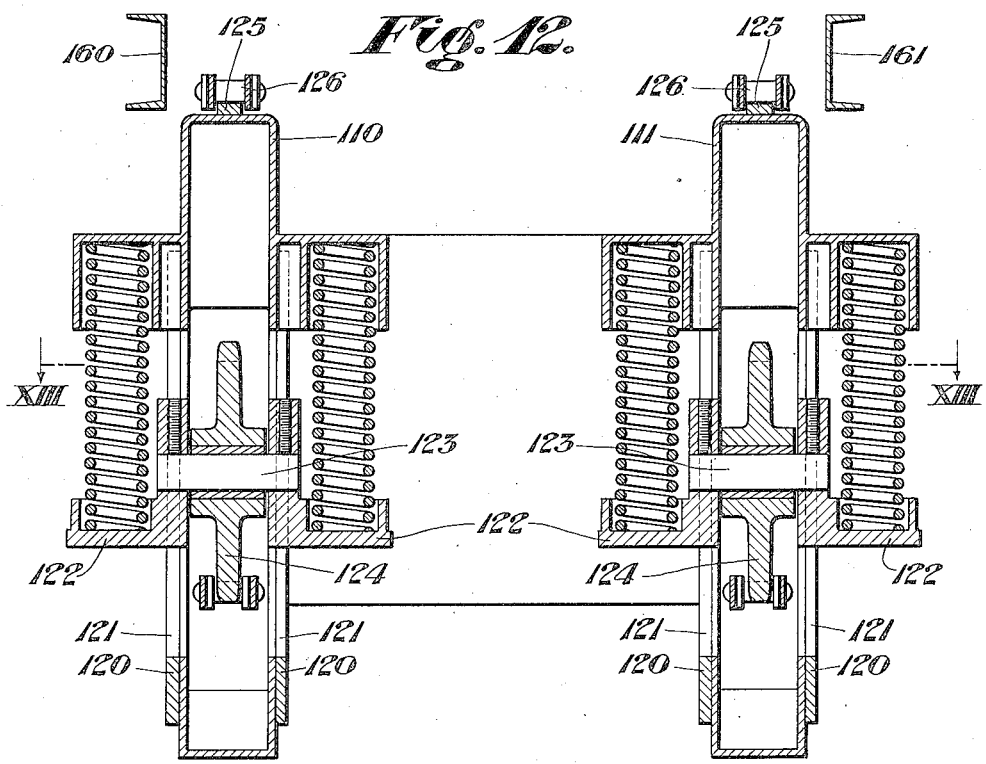
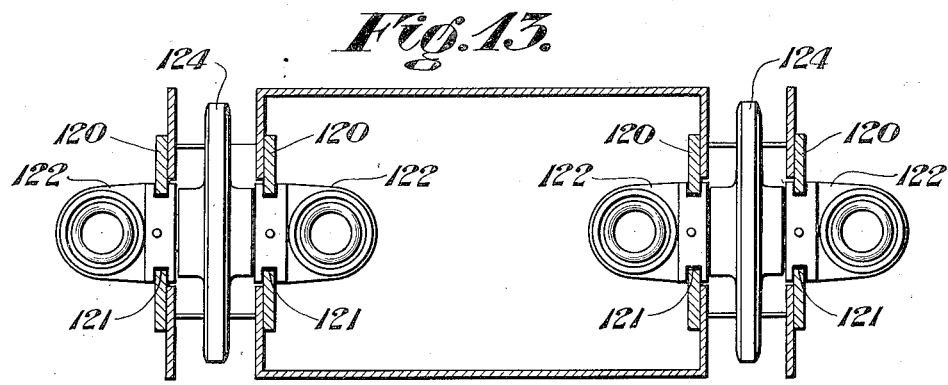

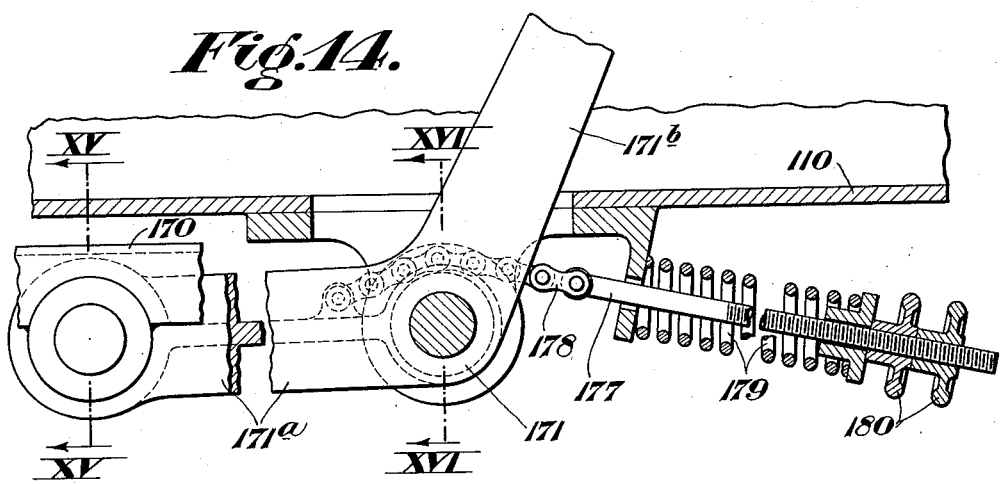
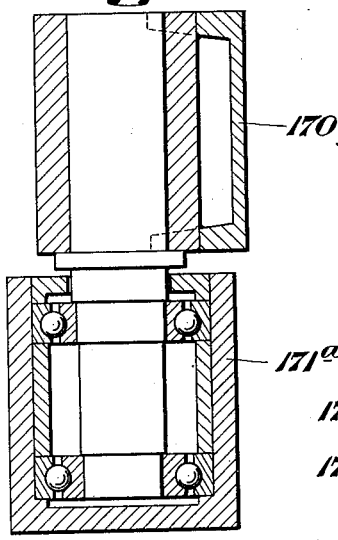
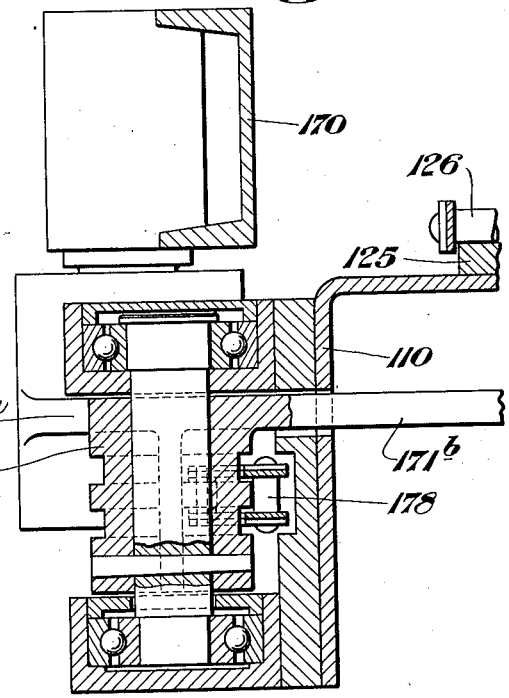

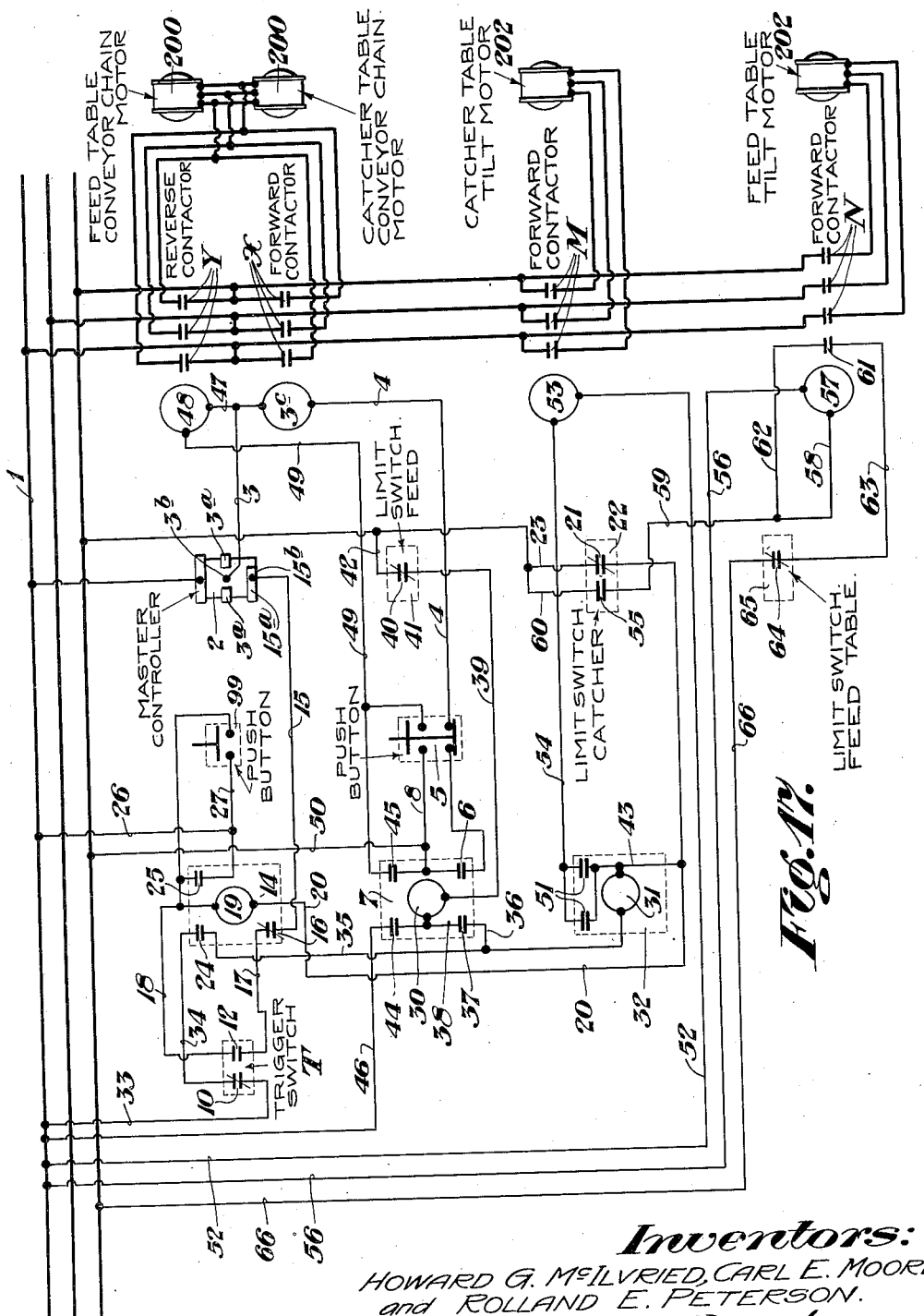

2,056,108

UNITED STATES PATENT OFFICE 2,056,108

ROLLING SHEET AND PACK

Howard G. McIlvried, Ross Township, Allegheny County, Pa., and Carl E. Moore, Gary, and Rolland E. Peterson, Aetna, Ind., assignors to American Sheet and Tin Plate Company, a corporation of New Jersey Application December 15, 1931, Serial No. 581,202

17 Claims. (Cl. 80—47)

This invention relates to hot rolling of sheets and packs and more particularly to mechanical handling mechanisms for automatically feeding the sheets and packs into the mill and for catching and returning the packs over the mill to the feeding means for successive passes, and has for its object the provision of novel mechanisms of this class which will maintain the sheets or packs flat, or substantially flat, during the entire rolling operation.

Another object is to provide an automatic sheet handling mechanism which is provided with a sheet operated control mechanism.

A still further object is to provide a novel form of control mechanism for sheet handling apparatus of this type.

In the drawings:

Figure 1 is a side elevation of the sheet handling mechanism of this invention applied to a sheet hot mill;

Figure 2 is a plan view thereof;

Figure 3 is an enlarged side elevation of the feed table;

Figure 4 is an enlarged side elevation of the catching table;

Figure 5 is an enlarged plan of the feed table;

Figure 6 is an enlarged plan of the catching table;

Figures 7 and 8 are sectional elevations taken on the lines VII—VII and VIII—VIII, respectively, of Figure 3.

Figures 9 and 10 are enlarged sectional elevations taken on the lines IX—IX and X—X, respectively, of Figure 7;

Figures 11 and 12 are sectional elevations taken on the lines XI—XI and XII—XII, respectively, of Figure 3;

Figure 13 is a sectional plan taken on the line XIII—XIII of Figure 12;

Figure 14 is an enlarged fragmentary detail plan of one of the crank arm supports for the guides of the catcher table;

Figures 15 and 16 are detailed sectional views taken on the lines XV—XV and XVI—XVI, respectively, of Figure 14; and Figure 17 is a diagram of the several operating and control circuits for the catcher and feed tables.

Referring more particularly to the drawings, the letter A designates a standard form of two-high hot rolling mill which is provided with an automatic feeding table B and catching table C.

The furnace D is of standard construction and is under the control of the roller. The sheets and packs are adapted to be fed into and through the furnace by suitable conveyer mechanism 400, which conveyer mechanism is adapted to have intermittent operation under the control of the roller. When the roller desires a freshly heated pack he will tramp a foot treadle or manipulate other switch operating means (not shown) which will, in turn, start the operation of the furnace conveyer 400 to deposit a single pack onto the inclined conveyer E, and the conveyer E will, in turn, deliver the heated pack onto the feeding table B. A suitable trigger 300 is mounted in the furnace D in position to be operated by the pack being discharged so as to stop the operation of the furnace conveyer immediately upon the discharge of a single pack.

B and C are of generally duplicate construction, and a general description of one will apply to both tables. The tables comprise the feeding and catching tables, a base 102 which is slidably mounted on a bed plate 103 for movement transversely of the mill and is adapted to be moved by means of a screw 104 threaded through a nut 105 secured against movement relative to the bed plate.

The screw 104 has its forward end engaged in a thrust block 106 and has its rear end provided with a head 107 adapted to be engaged by a bar or other tool when it is desired to rotate the screw. Suitable cooperating angle-shaped sliding guides 108 are secured to the base 102 and bed plate 103, and serve to guide the base during its movement.

A table frame is pivotally mounted on the base 102, and comprises a pair of side frame members 110 and 111 which are connected by end members 112 and 113. The side members 110 and 111 of the frame are provided with bearing openings in which a shaft 114 is journaled to provide pivotal mountings for the table frame.

The shaft 114 is also journaled in bearing supports 115 carried by the table base 102, and said shaft carries drive sprockets 116 at each end adapted to engage and drive conveyer chains, to be described.

The shaft 114 is driven by a motor 200, which is connected by a coupling 117 to a speed reducing mechanism 118 which is, in turn, connected by a coupling 119 to the shaft 114.

The side members 110 and 111 of table frame are provided with pairs of depending bearing supporting members 120 to the front and rear of the bearing for the shaft 114, which plates are provided with windows 121 in which spring pressed bearing blocks 122 are mounted.

Shafts 123 are secured in the blocks 122 and idler sprockets 124 are journaled on said shafts. Each of the said side members 110 and 111 of the table frame is provided with guides 125 on which the conveyer chains 126 run, and said chains are trained over the sprockets 127 keyed on shafts 128 mounted at each end of the table frame. The lower or bottom strand or stretch of the conveyer chains are trained under the spring pressed idler sprockets 124 and over the drive sprockets 116.

In order to tilt the tables about the shaft 114 a pair of trunnion bars 130 is slidably mounted in bearings 131 adjacent the mill end of the table frame. The bars 130 are held against rotation in the bearings 131 by pins 132 entered through elongated slots 133 in the bearings so as to provide for a limited sliding movement of the bars. The inner portions 134 of the bars are threaded into an elongated sleeve-like nut 135 having a hand wheel 136 to facilitate the turning of the nut. Rotation of the nut 135 in one direction will move the bars 130 outwardly through the side members of the frame and rotation in the opposite direction will retract the bars.

Suitable tilting links 137 are journaled on the projecting ends of the bars 130 and are adapted to be removed by retracting said bars. The links 137 have their lower ends adjustably connected to one end of threaded links 138, the other ends of which are adjustably connected to threaded levers 139 secured to a shaft 140 journaled in suitable bearings on the table base 102.

A tilting or crank lever 141 is secured to one end of the shaft 140 and is connected by a connecting-rod 142 to an eccentric or crank arm 143 carried by a shaft 144 of a speed reducing mechanism 145 which is connected through a flexible coupling 146 to a drive motor 202. The shaft 144 is adapted to rotate one-half a revolution to tilt the table up or down. The connecting-rod 142 is guided in its movement by a guide link 142ᵃ pivoted to the table base and to the rod 142.

In order to facilitate the lift or upward tilting of the tables a spring 147 is mounted on the connecting-rod 142 and one end of the spring bears against a collar 148 on the rod while the other end bears against a bracket 149 fixedly mounted on the table base and through which the rod 142 slides. As the rod 142 is moved forward or toward the mill to lower the table the spring 147 is compressed between the collar 148 and bracket 149, storing up energy which is released when the rod is started in the reverse direction to tilt the table upward.

Each of the shafts 144 of the tables is provided with adjustable cams 150 and 151 adapted to operate limit switches 41 and 22 of the respective tables B and C. An additional limit switch 65 is provided on the table B and is adapted to be operated by an eccentric or crank arm 143 of said table.

A sheet or plate stop member is journaled at the forward or mill end of the feed table B, and comprises a lever 155 secured to a shaft 156 journaled in bearings 157 on the mill housings. The lever 155 has its free end 158 turned up to form a stop adapted to be projected up into the path of the sheets being conveyed along the table B to stop said sheets before they enter the bite of the rolls.

The shaft 156 is adapted to be rocked by a lever 159 which is fixed to the shaft 156 and is adapted to be manually operated by the rollers.
A pair of guide or matching bars 160 and 161 are provided on the table B and are adapted to be moved into engagement with the packs of sheets being moved along the table to match or aline the side edges of said packs and to guide said packs into the mill.

The guides 160 and 161 are pivotally mounted adjacent each end to one arm 162ᵃ of a crank lever 162, which arm normally extends parallel to the side members of the table frame. The crank levers are pivotally secured at their crank portions or apexes to the side members of the table frame, and have their other arms 162ᵇ extending inwardly toward the center line of the table. The inwardly extending arms 162ᵇ of each pair of crank levers on the respective sides of the table frame are connected by connecting-rods 163 and the inwardly projecting arm 162ᵇ of one lever on one side of the table frame is connected to the inwardly projecting arm 162ᵇ of the lever on the opposite side and adjacent the opposite end of the table frame by a rod 164 so as to cause an equal movement of both of said guides.

A spring 165 is secured to said table frame and said rod 164 and is adapted to be tensioned when said guides are moved inwardly so as to return said guides to open position by exerting a pull on said rod 164 when the guides are released. A handle 167 is secured to the guide 160 by which the operator will move the guides inwardly to engage the pack of sheets.

A pair of guides 169 and 170 are provided on the table C. The guides 169 and 170 are each pivotally mounted adjacent each end to one arm 171ᵃ of a crank lever 171, which arm normally extends parallel to the side members of the table frame. The crank levers are pivotally secured at their crank portions or apexes to the side members of the table frame, and have their other arms 171ᵇ extending inwardly toward the center line of the table. The inwardly extending arm 171ᵇ of each pair of levers on the respective sides of the table are connected by connecting-rods 172, and the rods 172 are each connected by chains 173 to sprockets 174 on a shaft 175 adapted to be rotated by a worm and worm-wheel assembly 176 to take up or let out the chains 173. When the chains 173 are taken up the guides 169 and 170 will be moved away from each other and when said chains are let out the guides will be free to move toward each other. The worm and worm wheel assembly 176 is not used to operate the guides 169 and 170 for centering the packs or sheets being rolled, but is used to take up and let out the chains 173 for the purpose of limiting the movement of the rods 172 in a direction away from the mill and consequently limit the movement of the guides toward each other so as to prevent pinching the material being rolled.

Due to the mounting of the guides of the respective tables on the outer ends of the crank arms, the guides and arms move automatically by gravity toward the low ends of the table. This automatic movement of the guides, due to their mounting, causes the guides to automatically move away from each other when the tables are raised and to move toward each other when the tables are lowered, so that the packs are centered on the feeding table when being fed into the mill and on the catching table when being received onto the table. The guides 169 and 170, however, have their movement toward each other limited by the chains 173.

Spring tension rods 177 are connected to each of the arms 171ᵃ of the crank levers 171 farthest from the mill end of the catcher table C by short lengths of link chain 178, and coil springs 179 are mounted on each of said rods and have one end abutting a fixed part on the table side frame members and their other ends abutting nuts or wheels 180 threaded on said rods. The springs 179 serve to normally urge the side guides 169 and 170 inwardly and form a yieldable mounting which permits said guides to yield should a pack of sheets strike against them.

The main control switch T is mounted on the catcher table and is operated through the medium of a trigger 203 and connecting-rod 182. The trigger 203 is crank shaped and has one long and one short arm. The trigger 203 is pivotally mounted in a bracket 183 and has its long arm projecting up into the path of the sheets or packs at the mill end of the catcher table, while its short arm is connected by a short length of chain 184 to one end of the connecting-rod 182. The other end of the connecting-rod is attached to the operating lever 185 of the switch T through a cushion or take-up spring 186.

The connection of the trigger 203 and its link chain connection 184 with the connecting-rod 182 is such that the rod 182 is operated by the trigger 203 when said trigger is moved in either direction by the sheets passing on or off of the catching table, and the switch T is held in its operated position the entire time that the trigger is depressed. That is, the normally closed contact 10 is held open and contact 12 is held closed while the trigger 203 is depressed by a sheet or pack moving thereover.

Referring now particularly to Figure 17, the electric control for the automatic operation of the tables B and C will be described in detail by reference to the diagram of the drawings. With the tables in the position shown, that is, with both the feeding table and catching table in their down positions, the roller will operate the controller 2 from left to right so as to keep 15ª and 15ᵇ closed and engage the controller contacts 3ª and 3ᵇ, thus completing a circuit from power line 1 through the control contacts 3ª and 3ᵇ to line 3, thence through contactor coil 3ᶜ and line 4 to the normally closed push-button switch 5. From the push-button 5 the circuit will continue through the normally closed contact 6 of the relay 7 and then through the lines 8 and 50 to the other side of the line completing the circuit, thus energizing the coil 3ᶜ of a forward contactor X which is adapted to close the forward circuits to the conveyer motors 200 of tables B and C.

As the pack goes through the mill it engages and trips the trigger 203. which operates the switch T having one normally closed contact 10 and one open contact 12. As the switch is operated the contact 10 is opened and the contact 12 is closed to thereby make an energizing circuit to a relay 14 as follows: From line 1 through a controller 2, contacts 15ª and 15ᵇ of controller 2, line 15, normally closed contact 16 of relay 14, line 17, contact 12 of switch T and line 18 to coil 19 of relay 14. From the coil 19 the circuit is completed through line 20 and through normally closed contact 21 of catching table operated switch 22 and line 23 to the other side of the line. As the circuit is completed through the coil 19 the coil will be energized to open the contact 16 of the relay 14 and to close contacts 24 and 25 of relay 14. The contacts of relay 14 are so adjusted that the contact 25 closes before the closing circuit is broken through contact 16.

The instant contacts 24 and 25 are engaged by the armature the contact 25 completes a sealing circuit through the coil 19 so as to maintain the coil 19 energized until the catching table C operates the switch 22 to open the contact 21. The operation of the trigger switch T will not affect this sealing circuit. The sealing circuit made through the contact 25 is as follows: From the line 1 through lines 26 and 27, through contact 25 and line 18 to coil 19, thence through line 20 to the other side of the line. As the pack or sheet leaves the trigger 203 the switch T is operated to automatically close contact 10 and to open contact 12, thus making energizing circuits to coils 30 and 31 of relays 7 and 32, respectively. The circuit feeding coil 30 is from the line 1 through line 33, thence through the contact 10 and line 34 to contact 24 of relay 14, then through lines 35 and 36 to contact 37 of relay 7. From the contact 37 the circuit continues through line 38 and coil 30 to line 39, then through contact 40 of switch 41 on the feeding table B to line 42 and to the other side of the line. The coil 31 is energized by a circuit from the line 35 through the coil 31 to lines 43 and 20, then through the closed contact 21 of switch 22 and line 23 to the other side of the line.

Coil 30, being energized, closes contacts 44 and 45 of relay 7 and opens contacts 6 and 37. The operation of the relay 7 by the energization of the coil 30 which closes the contact 45 energizes contactor coil 48 which controls the chain motors by a circuit through line 3, line 47, coil 48, line 49, contact 45 and line 50 to the other side of the line. Energization of the coil 48 will close the contactor Y to complete a reverse circuit to the conveyer chain motors 200. Simultaneously with the energization of the coil 48 by the closing of the contact 45 contact 6 will be opened, thus breaking energizing circuit through the contactor coil 3ᶜ and opening the forward contactor X to break the forward energizing circuits to the conveyer chain motors 200.

Closing of the contact 44 of relay 7 will make a sealing circuit through the coil 30 from the line 1 through line 46, contact 44, coil 30, line 39, contact 40 of switch 41 and line 42 to the other side of line, thereby maintaining the coil 30 energized until the switch 41 on the feeding table B opens as the table B tilts downward to feeding position.

The contacts of relay 7 are so adjusted that contact 44 closes before contact 37 opens, to thereby complete the sealing circuit before the closing circuit is broken, thus insuring a closed circuit to coil 30 during the closing action of relay 7.

Coil 31 of the relay 32, when energized, closes a pair of contacts 51 which are in parallel. Closing of contacts 51 closes an energizing circuit for contactor coil of catcher table tilt motor control as follows: From the line 1 through line 52, through coil 53 and line 54 to the contacts 51, thence through lines 43 and 20 to the contacts 21 of switch 22 on the catching table, and line 23 to the other side of line. Energization of the coil 53 closes the contactor M for completing a circuit to the catching table tilt motor 202 which remains energized until contact 21 is opened by one of the catcher table cams 150 or 151 which operates the switch 22. Operation of the switch 22 by the cam on the catching table momentarily opens contact 21 and closes contact 55 of the switch 22 so as to make an energizing circuit through the feeding table tilt motor contactor coil 57 as follows: From the line 1 through line 56, coil 57, line 58, line 59, contact 55 and line 60 to the other side of the line. Energization of the coil 57 closes contactor N of the feeding table tilt motor 202, and also closes contact 61 which makes a sealing circuit through the coil 57 as follows: From the line 58 through a line 62, contact 61, line 63, contact 64 of a switch 65 operable by the tilting of the feeding table and thence through a line 66 to the other side of line. As long as contact 64 of the switch 65 remains closed, which is through a portion of the tilting movement of the feeding table, the sealing circuit through the coil 57 will remain closed.

Contact 21 of limit switch 22 is opened momentarily at a time during the upward movement of the catcher table so that the tilt motor will stop with the table in its uppermost position. Contacts 64 of limit switch 65 in like manner is opened momentarily at a time during the upward movement of the feed table so that the tilt motor will stop with the table in its uppermost position. When contact 21 of limit switch 22 opens it also breaks the circuit through coil 19 of relay 14, allowing contacts 24 and 25 to open and contact 16 to close. This produces no effect on the motors due to the fact that coil 30 is sealed in.

With the completion of the above circuits the sheets or packs have been fed through the mill, caught by the catching table, the conveyer chains on both tables have been reversed, the tables elevated and the sheets or packs conveyed over the mill from the catching table right to left.

The reducing rolls, of course, will be relatively adjusted after each reducing pass, this being done in the usual known manner.

As the sheet or pack passes from the catching table onto the feeding table the trigger of switch T will be operated to open contact 10 and close contact 12, thereby making an energizing circuit to the relay 14 as follows: From line 1 through controller 2, line 15, normally closed contact 16, line 17, contact 12 of the switch T, line 18 to the coil 19 of relay 14, then through line 20 to the normally closed contact 21 of the switch 22, then through line 23 to the other side of line. Energizing of the coil 19 closes the contacts 24 and 25 of relay 14. The closing of contact 25 again makes a sealing circuit through the coil 19 so as to maintain the coil energized until the catching table operates the switch 22 at approximately half-lowered position, to thereby open the contact 21.

The energizing circuit through the coil 53 is as follows: From the line 1 through the line 52 to coil 53, thence through line 54, contacts 51, lines 43 and 20 and through contact 21 of switch 22 and line 23 to the other side of the line. Energization of the coil 53 closes the contactor M for completing the energizing circuit through the catching table tilt motor to thereby lower the catching table. The circuit to the catching table tilt motor will remain closed until contact 21 of switch 22 is opened by the table cam operating the switch 22 as the catching table is lowered. Operation of the switch 22 by the cam on the catching table momentarily opens the contact 21 and closes contact 55 of the switch 22, thus momentarily making an energizing circuit through the feed table tilt motor contactor coil 57 as follows: From the line 1 through line 56 and coil 57, line 58, line 59, contact 55 and line 60 to the other side of the line. Energization of the coil 57 closes contactor N for completing a power circuit through the feeding table tilt motor to thereby cause said motor to lower the feeding table. The energization of coil 57 also closes contact 61, which makes a sealing circuit through the coil 57 as follows: From the line 58 through the line 62 and contact 61 to line 63, thence through contact 64 of the switch 65 on the catching table and line 66 to the other side of the line. Energization of both the catching and feeding table tilt motors as above described will cause the lowering of the tables. However, the catching table will be lowered in advance of the feeding table and the feeding table tilt motor will remain energized until contact 64 of the switch 65 is opened.

Contact 21 of limit switch 22 and contact 64 of limit switch 65 are each opened momentarily during the down travel of tables B and C, to thereby cause the tables to stop in their lowermost positions. When contact 21 of limit switch 22 opens it also breaks the circuit to coil 19 of relay 14 and allows said relay to resume its normal position with contact 16 closed and contacts 24 and 25 open.

When the feed table reaches approximately the mid position, in its down travel only, contact 40 of the switch 41 on the feeding table will be opened to break the circuit through the coil 30 and de-energization of the coil 30 permits contacts 44 and 45 of relay 7 to open and contacts 37 and 6 to close, thereby breaking the circuit to the feed motor, reversing contactor coil 48 and making a circuit to the forward contactor coil 3ᶜ, whereby the chains will move again in the forward direction. The tables are now ready for another cycle as the pack passes into the mill.

When it is desired to run off a finished pack the controller 2 is operated to break the connection to line 15 by opening the contacts 15ᵃ and 15ᵇ but preserving connections between 3ᵃ and 3ᵇ. A circuit is then made from the line 1 through the controller 2 and contacts 3ᵃ and 3ᵇ to line 3, coil 3ᶜ of the forward contactor of the chain motors, then through line 4 and normally closed push-button 5 to normally closed contact 6 and lines 8 and 50 to the other side of the line. The circuit thus completed will cause the chains to continue operating in a forward direction until the controller 2 is reset.

After the work is thus centered and machined, the roller will release the stop 158 and the guides 160 and 161. The pack will then be fed through the rolls and received by the catching table. When the trailing end of the pack has passed over the trigger 203 the catching table tilt motor is energized. During the raising of the catching table the cam 150 actuates the switch 22, thus energizing the feed table tilt motor and reversing the conveyor motors. By the time the catching table reaches its top position, the pack will have been started on its return movement. During the movement it runs over the trigger 203 and over the top roll of the mill A onto the feed table. When the pack clears the trigger 203 the catching table tilt motor is again energized, causing lowering of such table. During its downward movement, the cam 151 actuates the switch 22, thus energizing the feed table tilt motor and causing lowering of the feed table. As the feed table lowers, the switch 41 is actuated by the cam 151, thus causing reversal of the conveyor chains and starting the pack forward for another cycle. Push-button 5 when closed opens line 4 and closes line 8, thus breaking the circuit through forward contactor coil 3ᶜ and closing the circuit through reverse contactor coil 48, thus reversing the chain motors during the time that the push-button is held down.

The operation of this mechanism will be readily understood from a reading of the foregoing specification. With the tables in the position shown in the drawings, the roller or other workman will operate a suitable switch to start the conveyer 400 of the furnace D to discharge a heated sheet or pack of sheets onto the conveyer E. As the sheet or pack of sheets pass out of the furnace D they will engage the trigger 300 and operate a suitable switch to stop the conveyer 400 so that only a single sheet or pack of sheets will be discharged onto the conveyer E.

Prior to starting the furnace conveyer 400 the roller will operate the controller 2 so as to start the table conveyers in operation, as previously described.

The sheet or pack of sheets will move from the conveyer E onto the feed table B and be conveyed toward the mill A. The roller will operate the lever 159 so as to project the stop end 158 of the lever 155 into the path of travel of the sheet or pack, and when the sheet or pack strikes the stop 158 he will move the guides or matching bars 160 and 161 inwardly to center the work and, if a pack, to match the several sheets.

After the work is thus centered and matched the roller will release the stop 158 and guides 160 and 161 and the work will be automatically handled back and forth through and over the mill in accordance with the novel control previously described in detail until the proper gage has been reached, at which time the roller will again operate the controller 2 to run the finished work off the catching table.

The work handled by this apparatus is characterized by the absence of curl. Sheets and packs rolled by all previous methods have been purposely curled by causing them to pass up from the bite of the mill rolls over an idler roller termed in practice a "billy" roller. In the practice of the present invention this idler roller is dispensed with and the sheets or packs are passed into and out of the mill rolls on a line substantially tangent with the bite of the mill rolls so that no curl is formed.

This absence of curl greatly facilitates the handling, shearing and further processing of the sheets.

While we have shown and described our invention as applied to a two-high sheet hot mill, it will be understood that it may be applied to any form of two-high rolling mill or to a three-high mill. It will also be understood that we do not wish to be limited to the details of construction shown and described, since various modifications may be made without departing from the scope of our invention, as defined in the appended claims.

We claim:

1. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means determining the raising and lowering of the tables, a control member actuating the power means and effective for causing raising movement of the catching table, means for causing actuation of one of said control members so as to initiate a movement of the corresponding table, and means effective after such table has completed a part of such movement for actuating the other of said control means, thereby initiating movement of the other table, whereby the tables operate in sequence.

2. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means determining the raising and lowering of the tables, a control member actuating the power means and effective for causing raising movement of the feed table, a control member actuating the power means and effective for causing raising movement of the catching table, means effective when the pack is on the catching table for causing actuation of the control member for said table so as to initiate a movement of the catching table, and means effective after the catching table has completed a part of such movement for actuating the control member for the feed table, and thereby initiating movement of the feed table, whereby the catching table moves in advance of the feed table.

3. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means determining the raising and lowering of the tables, a control member actuating the power means and effective for causing raising movement of the feed table, a control member actuating the power means and effective for causing raising movement of the catching table, means for causing actuation of one of said control members so as to initiate a movement of the corresponding table, said means including a member actuated by movement of the pack, and means effective after such table has completed a part of such movement for actuating the other of said control means and thereby initiating movement of the other table, whereby the tables move in sequence.

4. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls into the feed table, conveyors on the tables on which a pack may be supported and adapted to advance the pack along such tables, power means determining the raising and lowering movement of the feed table, a control therefor, power means determining the raising and lowering movement of the catching table, a control therefor, a member associated with one of the tables and actuated by movement of the pack over such table, an operating connection between said member and the control means for such table including means effective upon movement of the pack past said member in one direction for actuating the control means for such table to cause one movement thereof, means effective upon movement of the pack past said member in the opposite direction for actuating the control means to cause return movement of such table, whereby the pack through such member controls the raising and lowering of the table, and connections effective upon such movement of such table for actuating the control of the other table to cause corresponding movement thereof.

5. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported and adapted to advance the pack along such tables, a motor for the feed table and effective for determining the raising and lowering movement thereof, a control for such motor, a motor for the catching table and effective for determining the raising and lowering movement thereof, a control for such motor, a member associated with the catching table and actuated by movement of the pack over such table, an operating connection between said member and the control means for the catching table including means effective upon movement of the pack past said member in one direction for actuating the control means for the catching table to cause one movement thereof, means effective upon movement of the pack past said member in the opposite direction for actuating the control means to cause return movement thereof, whereby the pack through such member controls the raising and lowering of the table, and connections effective upon such movements of the catching table for actuating the control for the feed table to cause corresponding movements thereof.

6. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means determining the raising and lowering of the tables, a control member actuating the power means and effective for causing upward and downward movement of the feed table, a control member actuating the power means and effective for causing upward and downward movement of the catching table, means for causing actuation of one of said control members so as to initiate a movement of the corresponding table, said means including a control element operatively so located with respect to the path of the pack that it is actuated by movement of the pack past said control element, and means effective after such table has completed a part of such movement for actuating the other of said control means and thereby initiating movement of the other table, whereby the tables move in sequence.

7. Apparatus for hot-holing flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means for driving the conveyors, power means determining the raising and lowering of the tables, a control member actuating the first-mentioned power means and effective for causing movement of the conveyors in either direction, a control member actuating the last-mentioned power means and effective for causing raising and lowering movement of the feed table, a control member actuating the last-mentioned power means and effective for causing raising and lowering movement of the catching table, a single control member associated with the catching table and actuated by movement of the pack over such table, an operating connection between such control member and the control means for the catching table including means effective upon movement of the pack past said member in one direction for actuating the control means for the catching table to cause one movement thereof, means effective upon movement of the pack past said member in the opposite direction for actuating the control means to cause return movement of the catching table whereby the pack through such member controls the raising and lowering of the table, and connections effective upon such movements of the catching table for actuating the control for the feed table to cause corresponding movements thereof.

8. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means for driving the conveyors in either direction, a control member actuating the power means, a member associated with one of the tables and actuated by movement of the pack over such table, an operating connection between said member and the control means including means effective upon movement of the pack past said member in one direction for actuating the control means to cause movement of the conveyors in one direction, and means effective upon movement of the pack past said member in the opposite direction for actuating the control means to cause movement of the conveyors in the reverse direction, whereby the pack through such member controls the movement of the conveyors in one direction or the other.

9. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means determining the raising and lowering of the tables, a control member actuating the power means and effective for causing movement of the feed table, a control member actuating the power means and effective for causing movement of the catching table, a member carried by and movable with one of the tables and operatively so located with respect to the path of the pack that it is actuated by movement of the pack, an operating connection between said member and the control means for such table effective upon movement of the pack past said member in one direction for actuating the control means for such table to cause one movement of such table, means effective upon movement of the pack past said member in the opposite direction for actuating a control means to cause return movement of such table whereby the pack through such member controls the raising and lowering of the table, and connections effective upon such movement of such table for actuating the control for the other table to cause corresponding movements thereof.

10. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means for driving the conveyors in either direction, control means for the power means, a member carried by and movable with one of the tables and operatively so located with respect to the path of the pack that it is actuated by movement of a pack over the table, an operating connection between said member and the control means including means effective upon movement of the pack past said member in one direction for actuating the control means to cause movement of the conveyor in one direction, and means effective upon movement of the pack past said member in the opposite direction for actuating the control means to cause reverse movement of the conveyors whereby the pack through such member controls the movement of the conveyors in one direction or the other.

11. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means for driving the conveyors in either direction, power means determining the raising and lowering of the tables, a control member actuating the first-mentioned power means and effective for causing movement of the conveyors, a control member actuating the last-mentioned power means and effective for causing raising or lowering of the feed table, a control member actuating the last-mentioned power means and effective for causing raising or lowering of the catching table, a control element carried by and movable with one of the tables and operatively so located with respect to the path of the pack that it is actuated by movement of the pack, an operating connection between said control element and the control means including means effective upon movement of the pack past said control element in one direction for actuating the control means to cause one movement of the table and to cause movement of the conveyors in one direction, means effective upon movement of the pack past said control element in the opposite direction for actuating the control means to cause return movement of such table and reverse movement of such conveyors, whereby the pack through such member controls the raising and lowering of the table and the forward and reverse movements of the conveyors, and connections effective upon said movements of such tables for actuating the control for the other table to cause corresponding movements thereof.

12. Apparatus for hot-rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means for controlling the upward and downward movement of the tables, an electrical control circuit actuating the power means, a switch in the control circuit, a control member operatively so located with respect to the path of a pack that it is actuated by movement of the pack, a connection between the control member and the switch effective upon movement of the pack over the table in one direction for moving the switch and thereby actuating the control means so as to cause one movement of a table and effective upon movement of the pack over the table in the opposite direction for actuating the switch to cause return movement of such table, and a second switch in the control circuit actuated by movement of a table and effective for closing the control circuit when the table is at its uppermost or lowermost position and for opening the control circuit at intermediate table positions, so as to render the first-mentioned switch ineffective if the table does not move to such upper or lower position.

13. Apparatus for hot rolling flat sheet metal in multiple thickness comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of a pack from the catching table over the upper of said pair of rolls onto the feed table, power means determining the raising and lowering movement of a table, a member associated with such table and actuated by movement of the pack thereover, means effective by movement of the pack past said member in one direction for actuating the power means to cause one movement of the table, and means effective by movement of the pack past said member in the other direction for actuating the power means to cause return movement of such table, whereby the pack through such member controls the raising and lowering of the table.

14. In a control system for sheet rolling mills provided with a plurality of rolls, in combination, a passer table and a catcher table disposed on opposite sides of the rolls, feeding means on the passer table for passing the sheet between the rolls, receiving means on the catcher table for conveying the sheet away from the rolls after a rolling operation has been performed, elevating means individual to each table for operating the tables to a position to clear the rolls, control means for effecting the reverse operation of the feeding and receiving means and initiating the movement of the elevating means individual to the catcher table to the clear position a predetermined time after the sheet leaves the passer table, and control means for initiating the functioning of the elevating means individual to the passer table after the catcher table is moved a predetermined distance, the first-named control means being adapted to effect the forward operation of the feeding and receiving means and initiating the movement of the elevating means individual to the catcher table to the initial position a predetermined time after the sheet leaves the catcher table.

15. Apparatus for rolling sheet metal comprising a mill having a pair of rolls defining a reducing pass, a feed table on the entering side of the mill, a catching table on the delivery side of the mill, the tables being mounted for raising and lowering movement so as to bring them into position for the passage of a pack from the feed table through said pass and onto the catching table, or into position for the passage of the pack from the catching table over the upper of said pair of rolls onto the feed table, conveyors on the tables on which a pack may be supported, and adapted to advance the pack along such tables, power means determining the raising and lowering of the tables, a control member actuating the power means and effective for causing movement of the catching table, a control member actuating the power means and effective for causing movement of the feed table, means for causing actuation of one of said control members so as to initiate a movement of the corresponding table, and means actuated upon movement of said table and after a part of such table movement has been completed for causing actuation of the other of said control means and thereby initiating movement of the other table, whereby movement of the first-mentioned table effects sequential movement of the other table.

16. Apparatus for rolling sheet metal comprising a mill having a pair of rolls defining a reducing pass, a catching table on the delivery side of the mill, such table being mounted for raising and lowering movement so as to bring it into position to receive a pack passed through said pass or into position to return a pack to the entering side of the mill at a point vertically spaced from said pass, power means determining the raising and lowering movement of said table, a member actuated by movement of a pack therepast, means effective by movement of the pack past said member in one direction for actuating the power means to cause one movement of the table, and means effective by movement of the pack past said member in the other direction for actuating the power means to cause return movement of said table, whereby the pack through such member controls the raising and lowering of the table.

17. Apparatus for rolling sheet metal comprising a mill having a pair of rolls defining a reducing pass, a catching table on the delivery side of the mill, such table being mounted for raising and lowering movement so as to bring it into position to receive a pack passed through said pass or into position to return a pack to the entering side of the mill at a point vertically spaced from said pass, power means determining the raising and lowering movement of said table, a member actuated by movement of a pack therepast, means effective by movement of the pack past said member in one direction for actuating the power means to cause one movement of the table, and means effective by movement of the pack past said member in the other direction for actuating the power means to cause return movement of said table, said member being positioned on the catching table side of a vertical plane through the edges of the rolls at the feeding side of the mill, whereby the pack through such member controls the raising and lowering of the table.

HOWARD G. McILVRIED.
CARL E. MOORE.
ROLLAND E. PETERSON.